(12) United States Patent
Oki

(10) Patent No.: US 7,380,882 B2
(45) Date of Patent: Jun. 3, 2008

(54) RECLINER ADJUSTER

(75) Inventor: Yasukazu Oki, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 304 days.

(21) Appl. No.: 11/207,874

(22) Filed: Aug. 22, 2005

(65) Prior Publication Data
US 2007/0040436 A1 Feb. 22, 2007

(51) Int. Cl.
*B60N 2/235* (2006.01)
*B60N 2/22* (2006.01)

(52) U.S. Cl. ........................ 297/367; 297/362

(58) Field of Classification Search ............. 297/367, 297/362
See application file for complete search history.

(56) References Cited

U.S. PATENT DOCUMENTS

| | | | |
|---|---|---|---|
| 4,770,464 A | 9/1988 | Pipon et al. | |
| 5,161,856 A * | 11/1992 | Nishino | 297/367 |
| 5,451,096 A | 9/1995 | Droulon | |
| 5,611,599 A * | 3/1997 | Baloche et al. | 297/367 |
| 5,681,086 A * | 10/1997 | Baloche | 297/367 |
| 5,685,611 A * | 11/1997 | Eguchi et al. | 297/367 |
| 5,749,626 A * | 5/1998 | Yoshida | 297/367 |
| 5,769,494 A * | 6/1998 | Barrere et al. | 297/367 |
| 6,007,152 A * | 12/1999 | Kojima et al. | 297/367 |
| 6,023,994 A * | 2/2000 | Yoshida | 297/367 X |
| 6,024,410 A * | 2/2000 | Yoshida | 297/367 X |
| 6,082,821 A * | 7/2000 | Baloche et al. | 297/367 X |
| 6,092,874 A * | 7/2000 | Kojima et al. | 297/367 |
| 6,328,382 B1 | 12/2001 | Yamashita | |
| 6,474,740 B1 | 11/2002 | Kondo et al. | |
| 6,609,756 B2 * | 8/2003 | Kojima et al. | 297/367 |
| 6,629,733 B2 * | 10/2003 | Matsuura et al. | 297/362 X |
| 6,634,713 B2 * | 10/2003 | Nonomiya et al. | 297/367 |
| 6,648,414 B2 * | 11/2003 | Ikegaya et al. | 297/367 |
| 6,666,515 B2 * | 12/2003 | Asano et al. | 297/367 X |

(Continued)

FOREIGN PATENT DOCUMENTS

EP 0 978 413 2/2000

(Continued)

*Primary Examiner*—Rodney B. White
(74) *Attorney, Agent, or Firm*—Wenderoth, Lind & Ponack, L.L.P.

(57) ABSTRACT

A recliner adjuster for adjusting an inclination of a seat back with respect to a seat cushion includes a guide bracket to be secured to one of the seat cushion and the seat back, an internal gear to be secured to the other of the seat cushion and the seat back, a cam interposed between the guide bracket and the internal gear, a pair of lock gears interposed between the guide bracket and the internal gear so as to be radially slidable in association with movement of the cam, and a mounting ring for mating the guide bracket and the internal gear with each other with the cam and the pair of lock gears accommodated therein. The mounting ring has a generally flat annular portion, a cylindrical side portion, and a plurality of bent portions formed at a distal end of the cylindrical side portion. The guide bracket and the internal gear are sandwiched between the generally flat annular portion and the plurality of bent portions of the mounting ring, and an outer peripheral surface of the internal gear is held in sliding contact with an inner surface of the cylindrical side portion of the mounting ring, thereby radially positioning the internal gear.

4 Claims, 5 Drawing Sheets

U.S. PATENT DOCUMENTS

| | | | |
|---|---|---|---|
| 6,843,533 B1 * | 1/2005 | Miyata et al. | 297/367 |
| 6,854,802 B2 * | 2/2005 | Matsuura et al. | 297/367 |
| 7,055,906 B2 * | 6/2006 | Shinozaki | 297/367 |
| 7,328,954 B2 * | 2/2008 | Sasaki et al. | 297/367 X |
| 7,334,843 B2 * | 2/2008 | Yamada et al. | 297/367 |

FOREIGN PATENT DOCUMENTS

| | | |
|---|---|---|
| JP | 2000-52826 | 2/2000 |
| JP | 2000-342368 | 12/2000 |

* cited by examiner

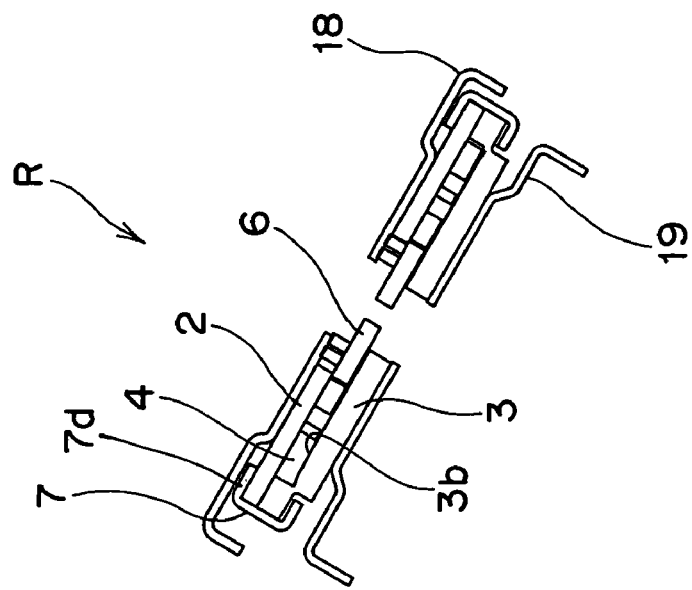
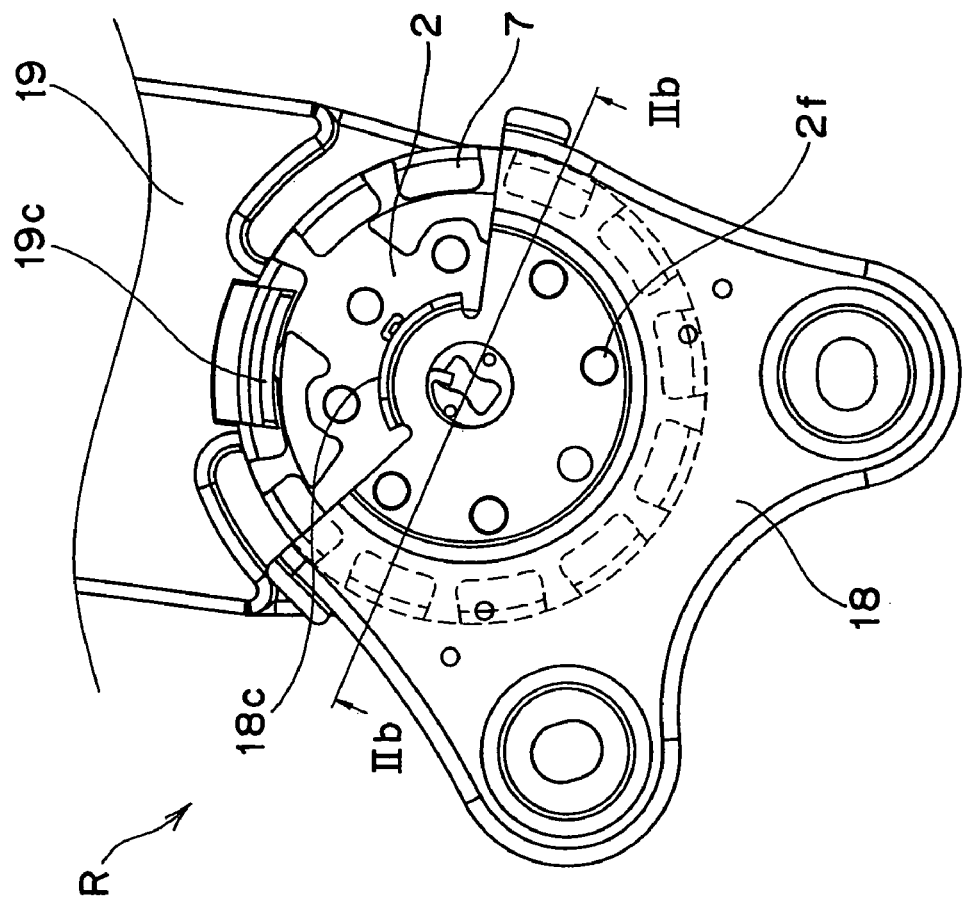

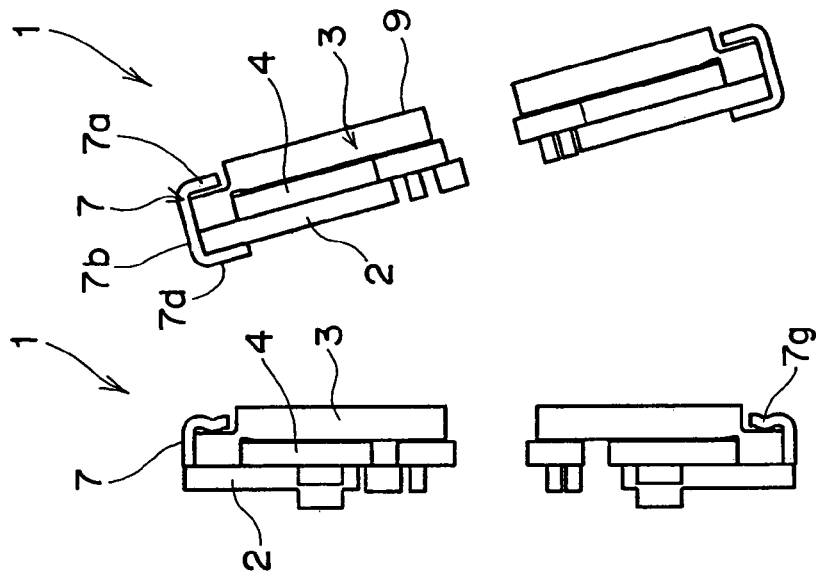
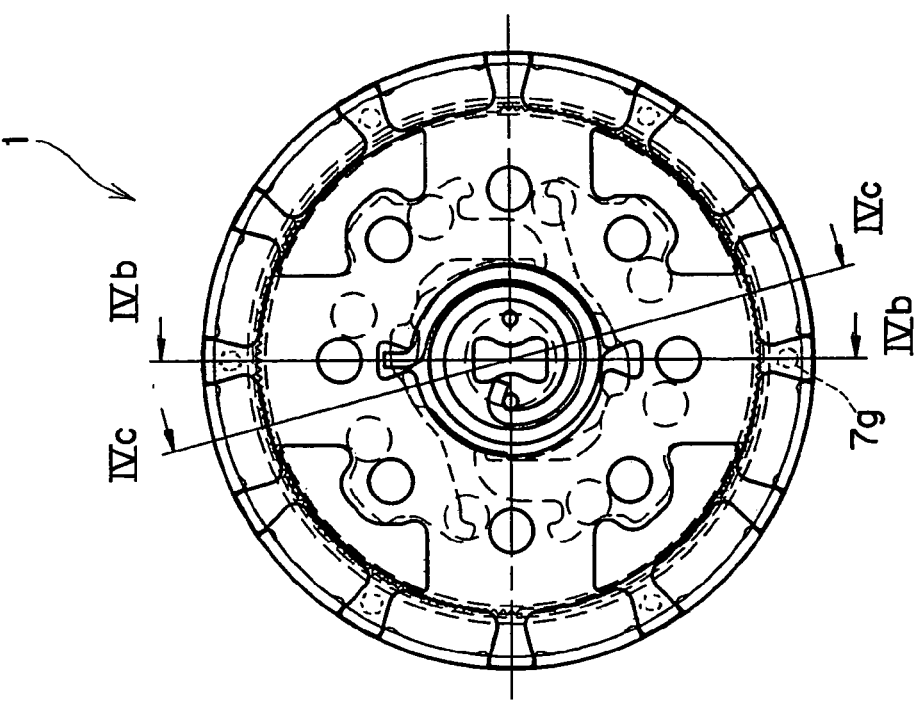

RECLINER ADJUSTER

BACKGROUND OF THE INVENTION

1. Field of the Invention

The present invention relates to a recliner adjuster attached to, for example, an automobile seat for appropriately adjusting inclination of a seat back with respect to a seat cushion.

2. Description of the Related Art

A recliner adjuster is interposed between a seat cushion and a seat back that can be inclined relative to the seat cushion. A conventional recliner adjuster generally includes a first bracket (or a lower arm) fixed to the seat cushion and a second bracket (or an upper arm) fixed to the seat back so as to be rotatable relative to the first bracket.

This recliner adjuster also includes a cam interposed between the first and second brackets and coupled to a support shaft, which is concentric with a center of rotation of the second bracket relative to the first bracket, for rotation together therewith. The cam is intended to radially slide, upon rotation of the support shaft, a lock gear interposed between the first and second brackets and having engaging teeth formed at a distal end surface thereof. The first bracket has a radially extending guide groove defined therein and having parallel side walls opposed to each other so that rotation of the cam may cause the lock gear to slide along the guide groove to protrude the engaging teeth from the guide groove or withdraw them inside the guide groove.

On the other hand, the second bracket has internal teeth formed along a circular arc locus having a center that is aligned with the center of rotation thereof. Rotation of the cam protrudes the lock gear outwardly from the guide groove to bring the engaging teeth into engagement with the internal teeth, thereby preventing rotation of the second bracket relative to the first bracket, while reverse rotation of the cam releases the engagement between the engaging teeth and the internal teeth, thereby allowing rotation of the second bracket relative to the first bracket.

Accordingly, by operating an operation lever to rotate the support shaft, the engaging teeth can be brought into engagement with the internal teeth to lock the seat back, while the engagement of the engaging teeth with the internal teeth can be released to change the inclination of the seat back (see, for example, Document 1 or 2).

Document 1: Japanese Laid-Open Patent Publication No. 2000-52826

Document 2: Japanese Laid-Open Patent Publication No. 2000-342368

In the recliner adjuster as disclosed in Document 1, the first bracket has a pair of crescent-shaped protrusions formed therewith that are to be inserted into respective recesses formed in the second bracket to guide the second bracket during rotation. This construction makes the recliner adjuster thick, making it difficult to reduce the size thereof. Further, the diameter of the internal teeth must be increased to enhance the locking strength, resulting in an increase in size of the recliner adjuster.

In the recliner adjuster as disclosed in Document 2, the upper arm having internal teeth is accommodated within a recess formed in the lower arm. The upper arm is held in sliding contact at its outer peripheral surface with a side wall of the recess in the lower arm, thereby radially positioning the upper arm relative to the lower arm. Further, the upper and lower arms are held together at their outer end portions by a clamp having opposite bent ends. This construction is advantageous to reduce the thickness of the recliner adjuster, but if the diameter of the internal teeth of the upper arm is increased to enhance the locking strength, the outer diameter of the upper arm and the diameter of the recess in the lower arm must be both increased and, hence, the outer diameter of the lower arm is inevitably increased, resulting in an increase in size of the recliner adjuster.

SUMMARY OF THE INVENTION

The present invention has been developed to overcome the above-described disadvantages.

It is accordingly an objective of the present invention to provide a compact recliner adjuster capable of increasing the locking strength without increasing the size thereof.

In accomplishing the above and other objectives, the recliner adjuster according to the present invention includes a guide bracket to be secured to one of a seat cushion and a seat back, an internal gear to be secured to the other of the seat cushion and the seat back, a cam interposed between the guide bracket and the internal gear, a pair of lock gears interposed between the guide bracket and the internal gear so as to be radially slidable in association with movement of the cam, and a mounting ring for mating the guide bracket and the internal gear with each other with the cam and the pair of lock gears accommodated therein. The mounting ring has a generally flat annular portion, a cylindrical side portion, and a plurality of bent portions formed at a distal end of the cylindrical side portion. The guide bracket and the internal gear are sandwiched between the generally flat annular portion and the plurality of bent portions of the mounting ring, and an outer peripheral surface of the internal gear is held in sliding contact with an inner surface of the cylindrical side portion of the mounting ring, thereby radially positioning the internal gear.

Advantageously, the mounting ring has a plurality of mounting pieces formed with the cylindrical side portion, and the guide bracket has a plurality of protrusions formed therewith at an outer edge thereof and a plurality of recesses defined between the plurality of protrusions, wherein an outer diameter of the internal gear is set to be substantially equal to a diameter of the plurality of recesses so that the plurality of mounting pieces are each received in one of the plurality of recesses. In this case, the plurality of bent portions are formed by bending distal ends of the mounting pieces.

The recliner adjuster also includes a mounting bracket to be secured to one of the seat cushion and the seat back, wherein the guide bracket is secured to the mounting bracket, and the bent portions are sandwiched between the mounting bracket and the guide bracket.

According to the present invention, because the outer peripheral surface of the internal gear is held in sliding contact with the inner surface of the cylindrical side portion of the mounting ring to thereby radially position the internal gear, if the guide bracket has an outer diameter equal to that of a guide bracket mounted in the recliner adjuster as disclosed in Document 2, the diameter of the internal teeth of the internal gear can be increased, making it possible to provide a compact recliner adjuster having an increased locking strength without increasing the size thereof.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein:

FIG. 2A is a front view of the recliner adjuster of FIG. 1;

FIG. 2B is a sectional view taken along line IIb-IIb in FIG. 2A;

FIG. 4A is a front view of the recliner assembly of FIG. 3;

FIG. 4B is a sectional view taken along line IVb-IVb in FIG. 4A;

FIG. 4C is a sectional view taken along line IVc-IVc in FIG. 4A;

DETAILED DESCRIPTION OF THE PREFERRED EMBODIMENT

This application is based on an application No. 2004-195748 filed Jul. 1, 2004 in Japan, the content of which is herein expressly incorporated by reference in its entirety.

Figure 1:
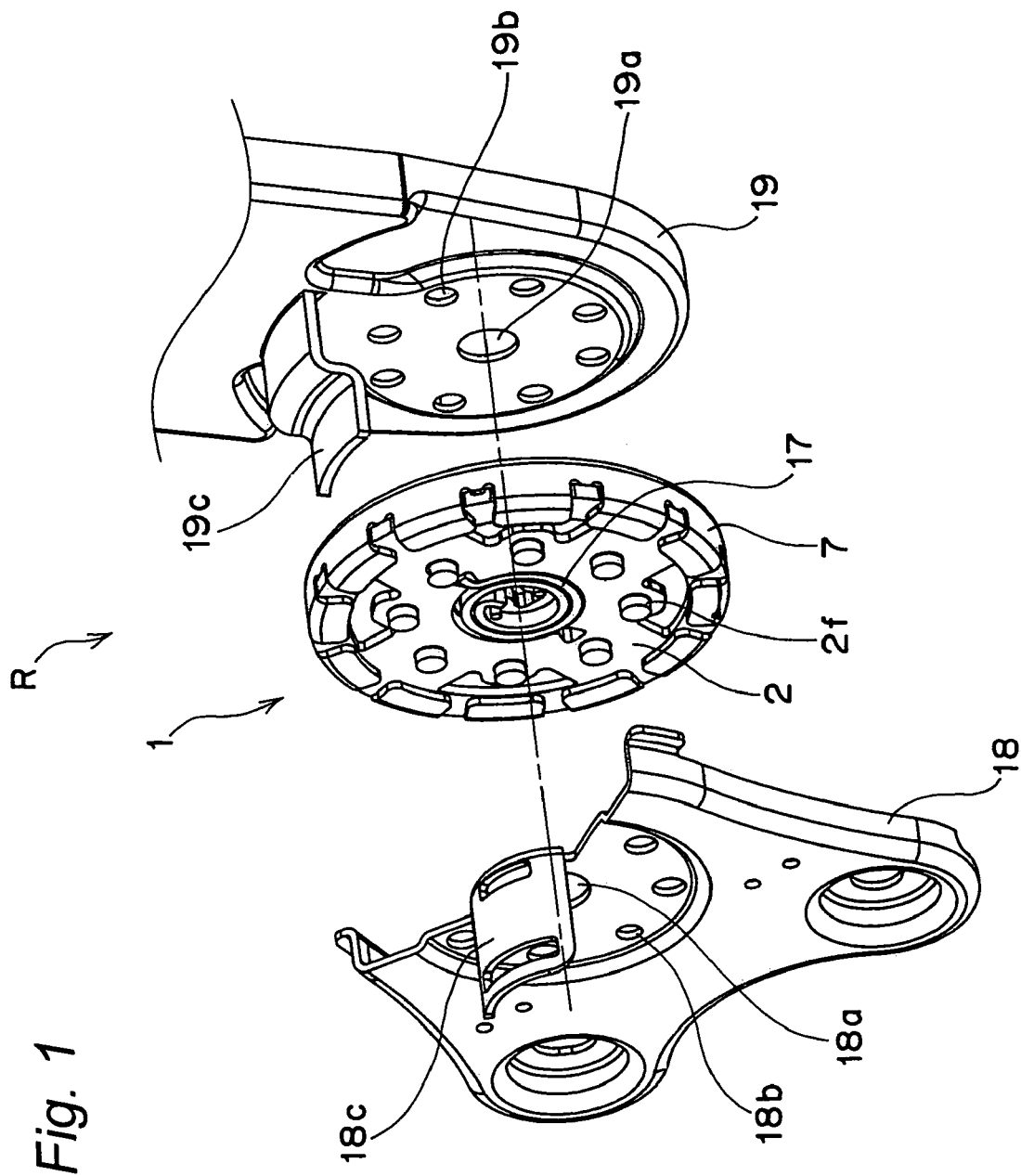
FIG. 1 is an exploded perspective view of a recliner adjuster according to the present invention.
Figure 3:
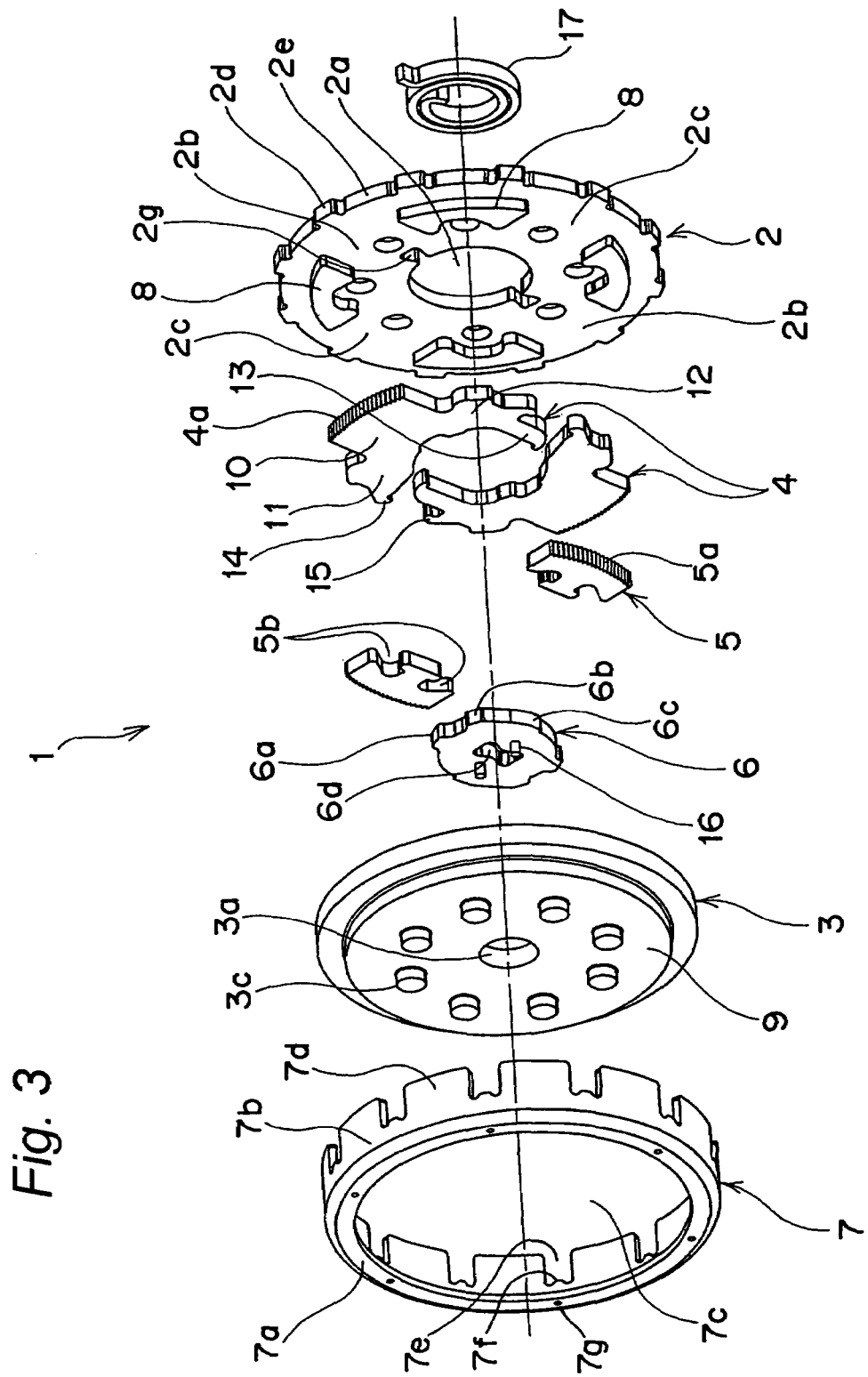
FIG. 3 is an exploded perspective view of a recliner assembly mounted in the recliner adjuster of FIG. 1.

FIG. 1 and FIGS. 2A and 2B depict a recliner adjuster R according to the present invention, which is to be mounted on respective sides of, for example, an automobile seat. The recliner adjuster R is intended to change inclination of a seat back (not shown) relative to a seat cushion (not shown).

The recliner adjuster R includes a generally round recliner assembly 1 mounted on a connecting portion between the seat cushion and the seat back. As shown in FIG. 3, FIGS. 4A-4C and FIGS. 5A and 5B, the recliner assembly 1 includes a guide bracket 2 to be secured to the seat cushion, an internal gear 3 to be secured to the seat back so as to confront the guide bracket 2, a pair of lock gears 4 interposed between the guide bracket 2 and the internal gear 3, a pair of auxiliary lock gears 5 interposed between the guide bracket 2 and the internal gear 3, and a cam 6 operable to move the pair of lock gears 4 towards and away from internal teeth of the internal gear 3. The guide bracket 2 and the internal gear 3 are assembled together by a mounting ring 7 with the lock gears 4, the auxiliary lock gears 5 and the cam 6 accommodated therein. The cam 6 is coupled to an operation lever (not shown), and upon operation of the operation lever, the cam 6 is rotated to radially slide the lock gears 4, followed by a radial sliding movement of the auxiliary lock gears 5.

The guide bracket 2 is formed into a generally round plate and has a central hole (operation lever insertion hole) 2a defined therein in which a portion of the operation lever is received for connection with the cam 6. The guide bracket 2 also has a pair of (front and rear) upper guide members 8 and a pair of (front and rear) lower guide members 8 formed therewith on an inner surface thereof (left side surface in FIG. 3, i.e., surface confronting the internal gear 3) so as to protrude inwardly in the widthwise direction of the recliner assembly 1. The guide members 8 are shaped in a point symmetric fashion with respect to the operation lever insertion hole 2a. The pair of upper guide members 8 have respective side walls extending parallel to each other that confront an associated one of the lock gears 4 and define a first guide groove 2b therebetween in which a portion (engaging portion) of the associated one of the lock gears 4 is slidably received. The same is true of the pair of lower guide members 8. Similarly, the upper and lower guide members 8 confronting each other have respective side walls extending parallel to each other that confront an associated one of the auxiliary lock gears 5 and define a second guide groove 2c therebetween in which one of the auxiliary lock gears 5 is slidably received. The first guide grooves 2b extend in a direction orthogonal to a direction in which the second guide grooves 2c extend. The guide bracket 2 further has a plurality of equally spaced protrusions 2d formed therewith at an outer edge thereof with a plurality of recesses 2e defined therebetween for engagement with the mounting ring 7. The diameter of the plurality of recesses 2e is set to be substantially equal to the outer diameter of the internal gear 3 (accordingly, the recesses 2e are substantially aligned or flush with the outer peripheral surface of the internal gear 3). As best shown in FIG. 1, the guide bracket 2 also has a plurality of equally spaced mounting pins (pin-shaped protrusions) 2f formed therewith around the operation lever insertion hole 2a so as to protrude outwardly in the widthwise direction thereof. The plurality of mounting pins 2f are to engage with a mounting bracket (explained later) that is secured to the seat cushion. The guide members 8 and the mounting pins 2f are unitarily formed with the guide bracket 2 by pressing predetermined portions of the guide bracket 2.

The internal gear 3 has a generally round shape and also has a round protrusion 9 formed therewith at an outer surface thereof (left side surface in FIG. 3) so as to protrude outwardly in the widthwise direction thereof. The round protrusion 9 has a central hole 3a defined therein so as to confront the operation lever insertion hole 2a in the guide bracket 2, and also has a plurality of equally spaced mounting pins (pin-shaped protrusions) 3c formed therewith around the central hole 3a so as to protrude outwardly in the widthwise direction thereof. The plurality of mounting pins 3c are to engage with a mounting bracket (explained later) that is secured to the seat back. Similar to the mounting pins 2f, the mounting pins 3c are unitarily formed with the internal gear 3 by pressing predetermined portions of the internal gear 3. The round protrusion 9 further has a recess 3b (see FIG. 2B) defined on a side thereof confronting the guide bracket 2. The radius of the recess 3b is set to be slightly greater than the radius of curvature of outer peripheral surfaces of the upper and lower guide members 8. As best shown in FIG. 5B, the recess 3b has a round side wall having internal teeth 3d formed on the whole surface thereof. When the guide bracket 2 and the internal gear 3 are assembled together, the guide members 8 are accommodated within the recess 3b so that the outer peripheral surfaces of the guide members 8 may be held in sliding contact with the side wall of the recess 3b.

Each lock gear 4 includes an engaging portion 10 slidably received in one of the first guide grooves 2b in the guide bracket 2, first and second shoulder portions 11, 12 unitarily formed with the engaging portion 10 on respective sides thereof, a leg portion 13 extending from the second shoulder portion 12 towards the first shoulder portion 11 of the opposite lock gear 4, a first auxiliary lock gear-operating portion 14 extending from the first shoulder portion 11 towards one of the auxiliary lock gears 5, and a second auxiliary lock gear-operating portion 15 extending from the second shoulder portion 12 towards the other of the auxiliary lock gears 5. The engaging portion 10 has engaging teeth 4a formed at a distal end thereof so as to be engageable with the internal teeth 3*d* of the internal gear 3. Under the condition in which the guide members 8 are accommodated within the recess 3*b* in the internal gear 3, rotation of the internal gear 3 relative to the guide bracket 2 is prevented by engagement between the engaging teeth 4*a* and the internal teeth 3*d*. Each lock gear 4 also includes a protrusion 13*a* formed with the leg portion 13 at an inner edge of a distal portion thereof. The protrusion 13*a* acts such that when a portion of the cam 6 engages with the protrusion 13*a* upon rotation of the cam 6, the lock gear 4 is caused to slide radially inwardly.

The length of the leg portion 13 is determined such that each lock gear 4 slidably received within the recess 3*b* in the internal gear 3 can move between an engaging position, at which the engaging teeth 4*a* formed at the engaging portion 10 are held in engagement with the internal teeth 3*d* of the internal gear 3 upon a radially outward movement of the lock gear 4, and an engagement released position at which the engagement of the engaging teeth 4*a* with the internal teeth 3*d* is released upon a radially inward movement of the lock gear 4. More specifically, the distance between the engaging position and the engagement released position is slightly greater than the depth of the engaging teeth 4*a*, and when the lock gear 4 moves radially outwardly from the operation lever insertion hole 2*a*, the engaging teeth 4*a* are brought into engagement with the internal teeth 3*d*, while when the lock gear 4 moves radially inwardly towards the operation lever insertion hole 2*a*, the engagement of the engaging teeth 4*a* with the internal teeth 3*d* is released.

Each auxiliary lock gear 5 has engaging teeth 5*a* formed at a distal end thereof so as to be engageable with the internal teeth 3*d* of the internal gear 3, and also has two recesses 5*b* defined therein in which the first auxiliary lock gear-operating portion 14 of one of the lock gears 4 and the second auxiliary lock gear-operating portion 15 of the other of the lock gears 4 are slidably received. The first and second auxiliary lock gear-operating portions 14, 15 of the lock gears 4 and the two recesses 5*b* in the auxiliary lock gears 5 are so shaped that when the lock gears 4 slide radially outwardly or inwardly, the auxiliary lock gears 5 similarly slide radially outwardly or inwardly.

The cam 6 is almost hexagonal and has three protrusions 6*a*, 6*b*, 6*c* confronting one of the lock gears 4 and three protrusions 6*a*, 6*b*, 6*c* confronting the other of the lock gears 4. The first protrusion 6*a* is engageable with an inner inclined surface 11*a* of the first shoulder portion 11 of the lock gear 4, the second protrusion 6*b* is engageable with a protrusion 12*a* formed at an inner edge of the second shoulder portion 12 of the lock gear 4, and the third protrusion 6*c* is engageable with the protrusion 13*a* of the leg portion 13 of the lock gear 4.

The cam 6 has an elongated hole 6*d* defined therein at a central portion thereof in which an operation lever is received for operation of the cam 6. The cam 6 also has two pins 16 secured thereto on respective sides of the elongated hole 6*d*. One end of a spiral spring 17 is connected to one of the two pins 16, and the other end of the spiral spring 17 is received in a notch 2*g* formed at an inner edge of the guide bracket 2, thereby causing the cam 6 to press the lock gears 4 radially outwardly.

The mounting ring 7 has a generally flat annular portion 7*a* and a cylindrical side portion 7*b* extending from an outer edge of the annular portion 7*a* in a direction perpendicular thereto. The annular portion 7*a* has a round hole 7*c* defined therein and having a diameter slightly greater than the outer diameter of the round protrusion 9 of the internal gear 3, while the cylindrical side portion 7*b* has a plurality of mounting pieces 7*d* formed therewith at intervals equal to those of the plurality of recesses 2*e* formed in the guide bracket 2 at an outer edge thereof. The mounting pieces 7*d* have a width slightly less than that of the recesses 2*e*. The inner diameter of the cylindrical side portion 7*b* is set to be substantially the same as (to be precise, slightly greater than) the diameter of the recesses 2*e* and the outer diameter of the internal gear 3.

In assembling the recliner assembly 1, the guide bracket 2 and the internal gear 3 are first mated together with the lock gears 4, the auxiliary lock gears 5, and the cam 6 interposed therebetween, and the mounting ring 7 is subsequently attached to the internal gear 3 so that each of the mounting pieces 7*d* may be inserted into one of the recesses 2*e* in the guide bracket 2, and the round protrusion 9 of the internal gear 3 may be inserted into the round hole 7*c* in the mounting ring 7. By so doing, a plurality of protrusions 7*f* formed at bottom portions of slits 7*e* between the mounting pieces 7*d* of the mounting ring 7 are brought into contact with inner surfaces of the protrusions 2*d* of the guide bracket 2. Under such condition, the assemblage of the recliner assembly 1 is completed by bending distal ends of the mounting pieces 7*d* inwardly by about 90 degrees.

As best shown in FIG. 4C, the guide bracket 2 and the internal gear 3 are sandwiched between the generally flat annular portion 7*a* and the bent portions of the mounting pieces 7*d* of the mounting ring 7, and the outer peripheral surface of the internal gear 3 is held in sliding contact with the inner surface of the cylindrical side portion 7*b* of the mounting ring 7, while an outer surface of the internal gear 3 located radially outwardly of the round protrusion 9 is held in sliding contact with an inner surface of the generally flat annular portion 7*a* of the mounting ring 7. Accordingly, looseness of the internal gear 3 in both the radial and widthwise directions is restrained by the mounting ring 7. That is, the positioning of the internal gear 3 in both the radial and widthwise directions is accomplished by the mounting ring 7. The mounting ring 7 has a plurality of (for example, six) protrusions 7*g* formed on the inner surface of the generally flat annular portion 7*a* at regular intervals, and the sliding contact between the outer surface of the internal gear 3 and the inner surface of the generally flat annular portion 7*a* of the mounting ring 7 is carried out by way of those protrusions 7*g*, thus ensuring a minimum clearance between the outer surface of the internal gear 3 and the inner surface of the generally flat annular portion 7*a* of the mounting ring 7 for smooth operation of the internal gear 3.

As shown in FIG. 1, a mounting bracket 18 that is to be secured to the seat cushion has an operation lever insertion hole 18*a* formed at a central portion thereof and a plurality of pin insertion holes 18*b* formed around the operation lever insertion hole 18*a* at regular intervals for insertion of the mounting pins 2*f* of the guide bracket 2 thereinto. A mounting bracket 19 that is to be secured to the seat back similarly has a connecting shaft insertion hole 19*a* formed at a central portion thereof and a plurality of pin insertion holes 19*b* formed around the connecting shaft insertion hole 19*a* at regular intervals for insertion of the mounting pins 3*c* of the internal gear 3 thereinto.

Upon completion of the assemblage of the recliner assembly 1, the mounting pins 2*f* of the guide bracket 2 are inserted into the pin insertion holes 18*b* in the mounting bracket 18 secured to the seat cushion, and the mounting pins 2*f* are welded to the mounting bracket 18, while the mounting pins 3*c* of the internal gear 3 are inserted into the pin insertion holes 19*b* in the mounting bracket 19 secured to the seat back, and the mounting pins 3*c* are welded to the mounting bracket 19, thereby holding the recliner assembly 1 between the two mounting brackets 18, 19. As shown in FIG. 2B, the mounting bracket 18 is so shaped that a surface thereof (surface confronting the recliner assembly 1) is held in contact with the outer surfaces of the bent portions of the 5 mounting pieces 7d in order to sandwich the bent portions between the guide bracket 2 and the mounting bracket 18. By so doing, when a load is applied to the recliner assembly 1, opening or spacing of the bent portions is prevented.

The two mounting brackets 18, 19 have respective outwardly bent latches 18c, 19c unitarily formed therewith, and a spiral spring (not shown) is connected at one end thereof to the latch 18c and at the other end thereof to the latch 19c to always bias the seat back forward.

One end of a connecting shaft (not shown) is inserted into the connecting shaft insertion hole 19a in the mounting bracket 19 secured to the seat back and is connected to an operation lever, while the other end of the connecting shaft is connected to the cam of the recliner adjuster located on the opposite side of the seat so that the two opposite recliner adjusters may be synchronously operated by operating the operation lever.

The operation of the recliner adjuster R according to the present invention is explained hereinafter with reference to FIGS. 5A and 5B.

Figure 5A:
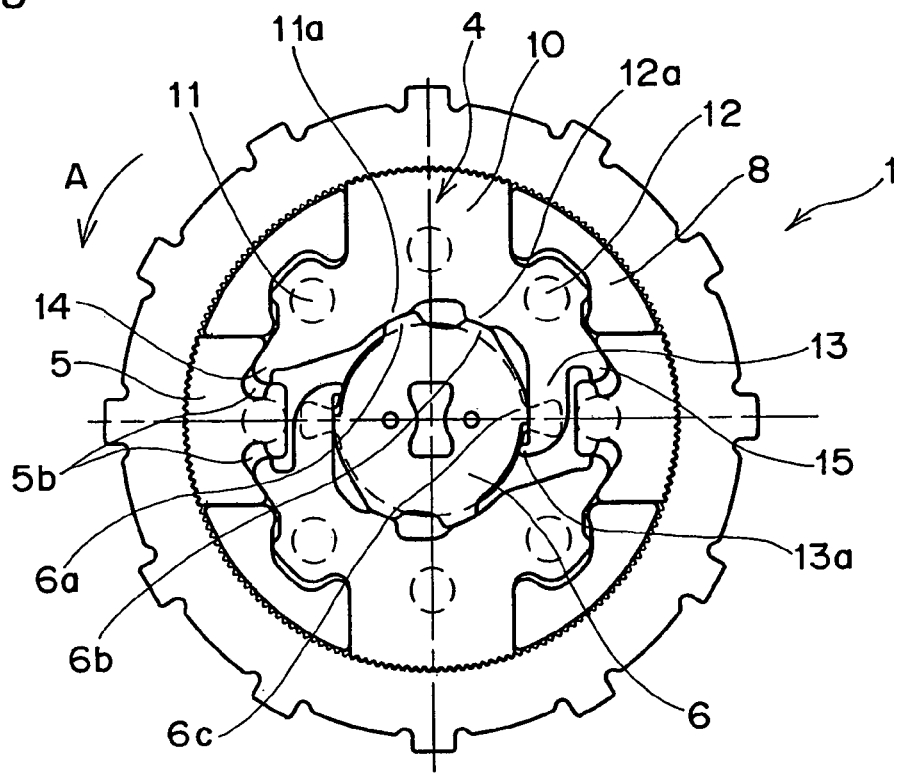
FIG. 5A is a front view of the recliner assembly of FIG. 3, particularly depicting a condition in which lock gears and auxiliary lock gears are held in engagement with an internal gear.
Figure 5B:
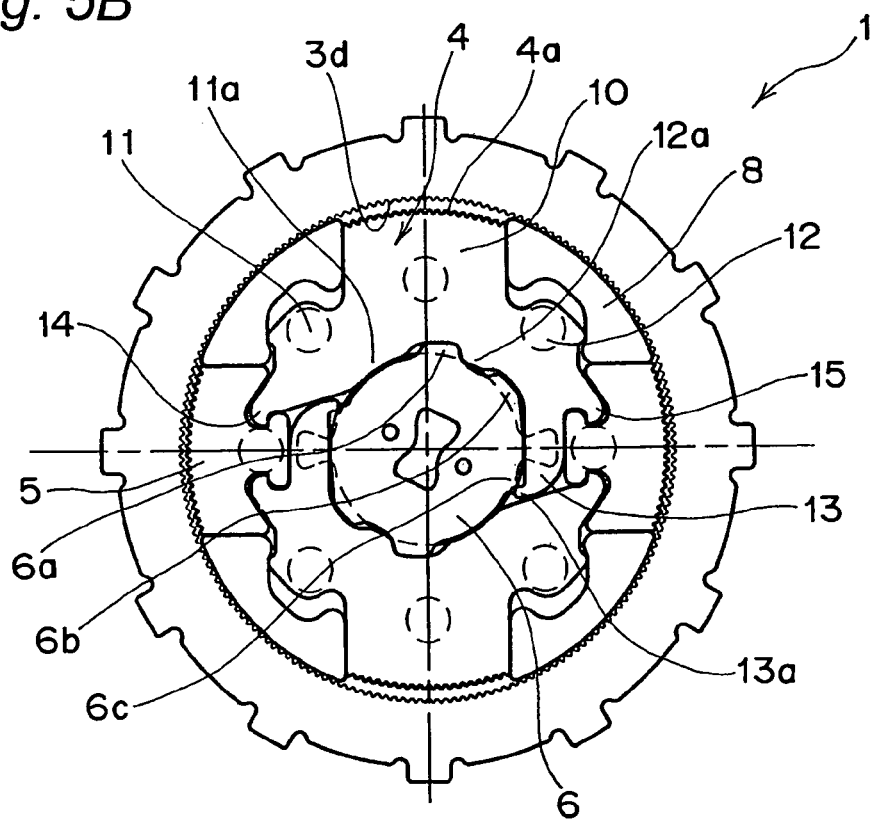
FIG. 5B is a view similar to FIG. 5A, but depicting a condition in which the engagements between the lock gears and the internal gear and between the auxiliary lock gears and the internal gear are released.

As shown in FIG. 5A, under the normal condition in which the operation lever is not operated, the cam 6 is biased in a direction of an arrow A by means of an elastic force of the spiral spring 17.

In this condition, the first and second protrusions 6a, 6b of the cam 6 are respectively held in contact with the inner inclined surface 11a of the first shoulder portion 11 of the lock gear 4 and with the protrusion 12a of the second shoulder portion 12 of the lock gear 4 to press the lock gear 4 radially outwardly, thereby causing the engaging teeth 4a of the lock gear 4 to engage with the internal teeth 3d of the internal gear 3. When the lock gear 4 is in the engaging position, outer edges of the first and second auxiliary lock gear-operating portions 14, 15 press side walls of the recesses 5b in the auxiliary lock gears 5 radially outwardly, thereby causing the engaging teeth 5a of the auxiliary lock gears 5 to engage with the internal teeth 3d of the internal gear 3. Accordingly, the position of the internal gear 3 relative to the guide bracket 2 or the inclination of the seat back relative to the seat cushion is maintained at a predetermined position or a predetermined angle.

In this condition, when the operation lever is lifted against the elastic force of the spiral spring 17, the cam 6 is rotated in a direction counter to the direction of the arrow A, and the first protrusion 6a of the cam 6 is introduced into a recess defined between the inner inclined surface 11a and the protrusion 12a of the lock gear 4, while the second protrusion 6b of the cam 6 is introduced into a recess defined on the inner side of the second shoulder portion 12 of the lock gear 4. Furthermore, the third protrusion 6c of the cam 6 is brought into contact with and presses the protrusion 13a of the leg portion 13 of the lock gear 4 to thereby slide the engaging portion 10 of the lock gear 4 radially inwardly along the first guide groove 2b. As a result, the engagement between the engaging teeth 4a and the internal teeth 3d of the internal gear 3 is released, and the lock gear 4 moves from the engaging position shown in FIG. 5A to the engagement released position shown in FIG. 5B. During such movement of the lock gear 4, inner edges of the first and second auxiliary lock gear-operating portions 14, 15 press the side walls of the recesses 5b in the auxiliary lock gears 5 radially inwardly, thereby releasing the engagement between the engaging teeth 5a of the auxiliary lock gears 5 and the internal teeth 3d of the internal gear 3. Accordingly, the posture (inclination) of the seat back relative to the seat cushion can be changed.

After the posture of the seat back relative to the seat cushion has been set to a desired one, when the operation lever is released, the cam 6 is rotated in the direction of the arrow A by means of the elastic force of the spiral spring 17 to thereby slide the lock gear 4 and the auxiliary lock gears 5 radially outwardly. As a result, the engaging teeth 4a, 5a engage with the internal teeth 3d of the internal gear 3 again, thereby holding the seat back in the newly set posture.

It is to be noted here that although in the above-described embodiment the guide bracket 2 and the internal gear 3 have been described as being respectively secured to the seat cushion and the seat back, such a construction that the guide bracket 2 and the internal gear 3 are respectively secured to the seat back and the seat cushion is also possible.

It is also to be noted that in the case where a sufficient locking strength with respect to a maximum load that would be applied to the seat back can be ensured only by the engagement of the engaging teeth 4a of the two lock gears 4 with the internal teeth 3d of the internal gear 3; the auxiliary lock gears 5 are not always needed. In that case, it is not necessary to form the internal teeth 3d on the whole surface of the round side wall of the recess 3b in the internal gear 3, and it is sufficient if they are formed on only a portion of the round side wall of the recess 3b that engages with the lock gears 4.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster for adjusting an inclination of a seat back with respect to a seat cushion, comprising:
    a guide bracket to be secured to one of the seat cushion and the seat back;
    an internal gear to be secured to the other of the seat cushion and the seat back;
    a cam interposed between the guide bracket and the internal gear;
    a pair of lock gears interposed between the guide bracket and the internal gear so as to be radially slidable in association with movement of the cam; and
    a mounting ring for mating the guide bracket and the internal gear with each other with the cam and the pair of lock gears accommodated therein, the mounting ring having a generally flat annular portion, a cylindrical side portion, and a plurality of bent portions formed at a distal end of the cylindrical side portion;
    wherein the guide bracket and the internal gear are sandwiched between the generally flat annular portion and the plurality of bent portions of the mounting ring, and an outer peripheral surface of the internal gear is held in sliding contact with an inner surface of the cylindrical side portion of the mounting ring, thereby radially positioning the internal gear.

2. The recliner adjuster according to claim 1, wherein the mounting ring has a plurality of mounting pieces formed with the cylindrical side portion, and the guide bracket has a plurality of protrusions formed therewith at an outer edge thereof and a plurality of recesses defined between the plurality of protrusions, and wherein an outer diameter of the internal gear is set to be substantially equal to a diameter of the plurality of recesses so that the plurality of mounting pieces are each received in one of the plurality of recesses, the plurality of bent portions being formed by bending distal ends of the mounting pieces.

3. The recliner adjuster according to claim 2, further comprising a mounting bracket to be secured to one of the seat cushion and the seat back, wherein the guide bracket is secured to the mounting bracket, and the bent portions are sandwiched between the mounting bracket and the guide bracket.

4. The recliner adjuster according to claim 1, wherein an outer diameter of said internal gear is substantially equal to an inner diameter of said cylindrical portion of said mounting ring.

* * * * *